Sept. 5, 1939.  P. L. MACKIE  2,171,835
FLOWERPOT COVER
Filed Sept. 25, 1937
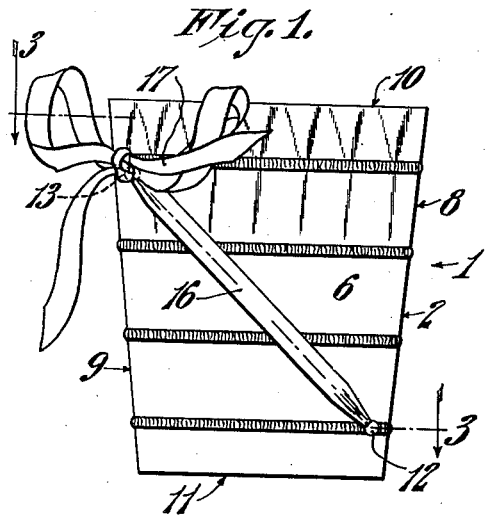
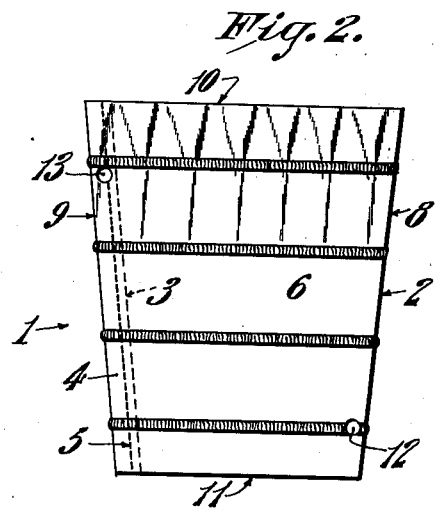
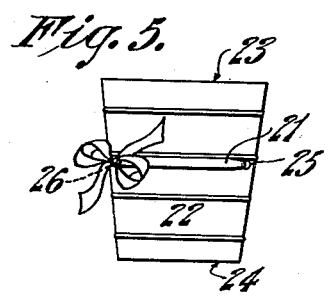
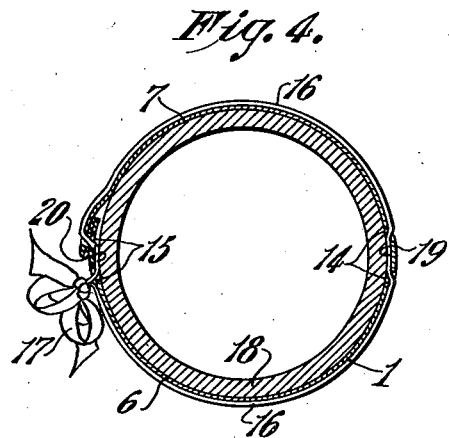
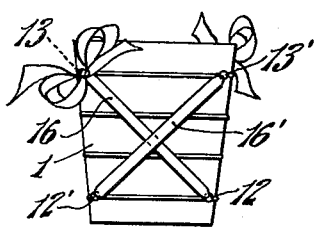
INVENTOR,
Paul L. Mackie,
BY Blake A. Seaver
ATTORNEY.

Patented Sept. 5, 1939

2,171,835

UNITED STATES PATENT OFFICE 2,171,835

FLOWERPOT COVER

Paul L. Mackie, Westfield, Mass.

Application September 25, 1937, Serial No. 165,654

11 Claims. (Cl. 41—10)

This invention relates to improvements in flower pot covers.

An object of this invention is to provide a flower pot cover which is mechanically adaptable to flower pots of different diameters, within reasonable limits.

Another object of this invention is to provide a combination of flower pot cover and ornamental ribbon in which the ribbon is attached or secured on the cover to prevent accidental loss or removal of the ribbon from the cover.

It is customary in the florist's trade to provide pot covers for their potted plants. These covers are generally purchased from florist's supply houses, and slipped over the pots by the florist when a sale is made or an order filled. As the pots are tapered from top to bottom, some difficulty is experienced in preventing the covers from slipping off of the pots. To overcome this difficulty, it has been customary to tie an ornamental ribbon horizontally around the pot and cover, to add decorative appearance to the assembly and to assist in binding the cover to the pot. The function of a ribbon thus used is unsatisfactory, as it must be tied horizontally, and cannot remain tight on a tapered pot. As a result, many potted plants are delivered to customers without their ornamental ribbons, which have been lost in shipment, and also without pot covers which, deprived of their binding ribbon, slip off of the pots and are lost. The invention herein disclosed is designed to overcome these difficulties by providing a pot cover and ornamental ribbon as an unitary structure.

A further object of this invention is to provide an ornamental pot cover which will, in use, save the florist's time in packaging potted plants. The florists' business is particularly susceptible to rush seasons and peak loads, and a great deal of valuable time is consumed in binding the covers on the pots. This lost time will be entirely eliminated with the use of this invention.

These, and other objects and advantages of this invention will be more completely disclosed and described in the following specification, the accompanying drawing, and the appended claims.

Broadly, this invention comprises, in combination, a pot cover, preferably of crepe paper and formed to fit a tapered pot, which is circular in cross section, and a ribbon or band of suitable material permanently secured on the pot cover in such a manner as to permit constriction of the band or ribbon to bind the cover on the pot.

A preferred embodiment of this invention is illustrated in the accompanying drawing, in which—

Fig. 1 is a front elevational view of an assembled pot cover, folded flat.

Fig. 2 is a view similar to Fig. 1, with the ornamental ribbon removed.

Fig. 3 is a sectional view taken on the line 3—3 of Fig. 1, looking in the direction of the arrows.

Fig. 4 is a cross sectional view of a pot with the pot cover assembled thereon.

Fig. 5 is a view similar to Fig. 1, showing a modified form of the invention, and Fig. 6 is a view similar to Fig. 5, illustrating a further modification.

Referring now to the drawing in detail, in which like numerals refer to like parts throughout:

A pot cover 1 is formed in the usual manner by folding a flat strip of material, preferably crepe paper, at 2, turning in the ends 3 to form a seam 4, and binding the seam 4 with stitching 5, or other suitable means, such as metallic staples. Thus, the cover 1, as manufactured and sold, is a flat article having a front portion 6, back portion 7, closed and tapered side edges 8 and 9, and open top and bottom 10 and 11. After being formed, as above described, the cover 1 is punched to provide an opening 12 adjacent the side edge 8 and bottom 11 and an opening 13 in the seam 4 adjacent the top edge 10 and side edge 9. The opening 12 penetrates both the front portion 6 and back portion 7, and the opening 13 penetrates the front portion 6, back portion 7, and folded-in ends 3. When the cover 1 is opened for covering a pot, as indicated in Fig. 4, the opening 12 becomes a pair of spaced openings 14, and the opening 13 becomes a pair of openings 15 diametrically opposed to the pair of openings 14.

A ribbon 16 is threaded through the openings 12 and 13, as indicated in Fig. 1, and may be tied in any desired ornamental bow 17, thus becoming fixedly secured on the cover 1 by engagement in the openings 12 and 13.

In use, the cover 1 is opened and drawn over a pot 18, as indicated in Fig. 4, with the ribbon 16 exposed on the outside of the cover with the exception of the portions 19 and 20, which pass beneath the cover 1 between the pairs of openings 14 and 15, respectively. The inherent elasticity of the crepe paper of which the cover 1 is preferably formed will adapt the cover 1 to cling to pots having a more or less normal variation in diameter, and the ribbon 16 serves both as an ornament and an additional binder to secure the cover on the pot. If the cover is used on a pot having a diameter too small for normal frictional engagement of the cover, the bow 17 may be untied, the ribbon 16 taken up to constrict the cover 1, and the bow retied.

As the ribbon 16 is permanently attached to the cover 1, the ribbon may be arranged on the cover 1 at any desired angle, without danger of loss or accidental removal. Figs. 5 and 6 indicate possible variations in arrangement of the cover and ribbon. In Fig. 5, a ribbon 21 is secured on a cover 22 in a horizontal position, approximately half way between the top edge 23 and bottom edge 24 of the cover 1, by engagement in openings 25 and 26. In Fig. 6, the diagonally positioned ribbon 16 is supplemented by a second ribbon 16', oppositely disposed and engaged in openings 12' and 13' complementary to the openings 12 and 13.

This invention thus provides a combination of pot cover and ribbon in which the ribbon is fixedly secured on the cover and serves as an ornament and as a supporting and constricting means for binding the cover on a flower or plant pot.

It is possible, and may be desirable in some cases, to manufacture and sell the invention without tying the bow 17, so that a florist using the invention may tie a bow of his own design.

What I claim is:

1. A flower pot cover comprising in combination a cover member provided with a plurality of spaced openings, and a ribbon encircling said cover and secured thereon by engagement in said openings.

2. A flower pot cover comprising, in combination, a cover member provided with a pair of spaced openings, and a constricting element encircling said cover and secured thereon by engagement in said openings.

3. A flower pot cover comprising a strip of material to encircle a flower pot and having its ends turned in and secured together in a vertical seam, said cover being folded flat with said seam forming one side edge, said folded cover being provided with an opening adjacent each side edge, and a ribbon secured on said cover by engagement in said openings.

4. A flower pot cover comprising a strip of material to encircle a flower pot and having its ends secured together in a vertical seam, said cover being folded flat and pierced to provide an opening in the folded cover adjacent each side edge, and a strip member secured on and around said cover by engagement in said openings.

5. A flower pot cover comprising a tubular cover member provided with oppositely disposed pairs of spaced openings and a ribbon encircling said cover and secured thereon by engagement in said openings.

6. A flower pot cover comprising a tubular cover member provided with a pair of horizontally spaced openings adjacent its top edge and a second pair of horizontally spaced openings adjacent its bottom edge, and a ribbon secured on said cover by engagement in said openings.

7. A flower pot cover comprising a tubular cover member provided with a pair of spaced openings adjacent its top edge and a second pair of openings adjacent its bottom edge and diametrically opposed to said first pair of openings, and a constricting strip member secured on said cover member by engagement in said openings.

8. A flower pot cover comprising a strip of flexible material having its ends secured in a vertical seam and being folded flat to provide an article having a front and back wall, tapering side edges, and parallel top and bottom edges, said article being provided with registering openings through its front and back walls, adjacent each side edge, and a ribbon threaded through said openings and having its ends secured together.

9. A flower pot cover comprising a tubular, tapered cover member, normally pressed flat before use on a pot to provide a flat article having parallel top and bottom edges and downwardly converging side edges, said flat article being pierced to provide an opening adjacent a side edge and the top edge and a second opening adjacent the opposite side edge and the bottom edge, and an ornamental ribbon secured in a diagonal position on said flat article by engagement in said openings.

10. A flower pot cover comprising a tapered, tubular member provided with opposed pairs of openings, and a ribbon secured on and around said cover member by engagement in said openings, whereby said cover member may be constricted on a flower pot by drawing taut said ribbon.

11. A flower pot cover comprising a tapered, tubular member of flexible material and provided with a pair of spaced openings adjacent its top edge and a second pair of spaced openings adjacent its bottom edge and diametrically opposed to said first pair of openings, and a constricting ribbon secured on said cover member by engagement in said openings.

PAUL L. MACKIE.